June 8, 1926.
W. BROWNLOW
ATTACHMENT FOR BRINE TANKS
Filed Jan. 29, 1924
1,588,163
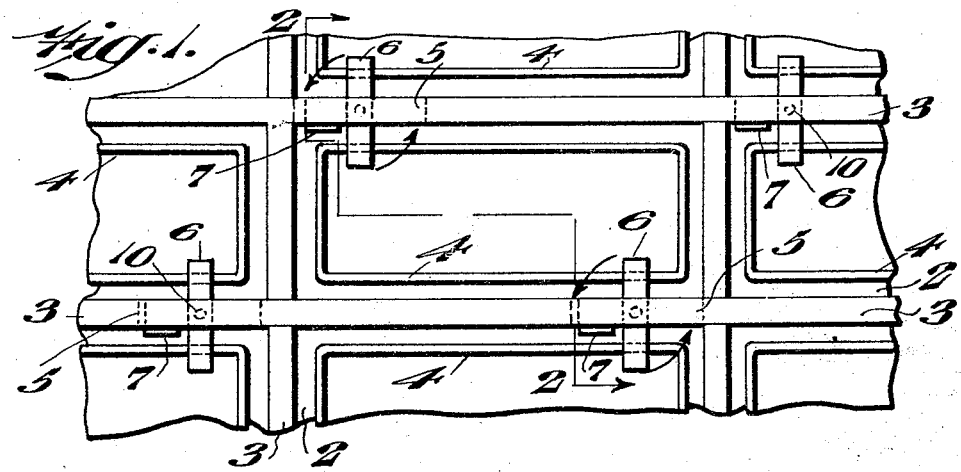
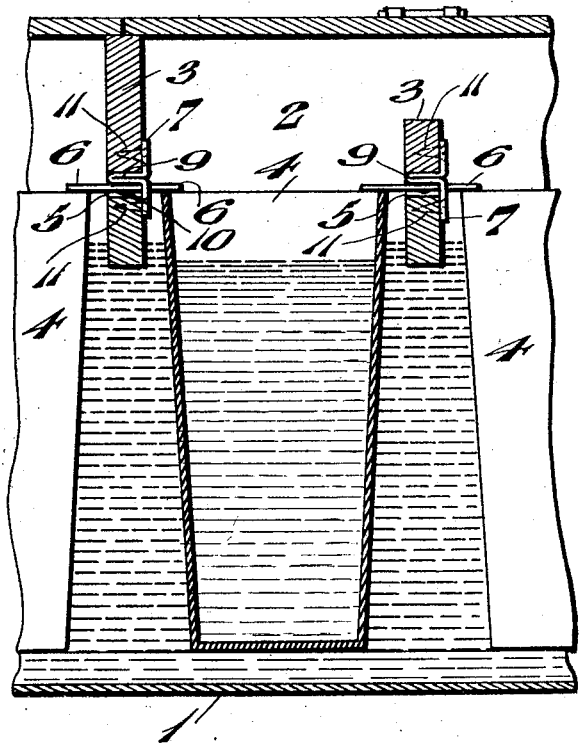
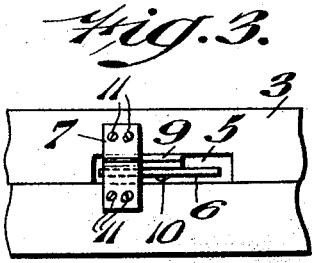
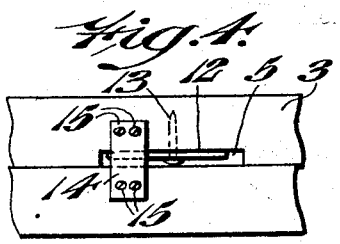
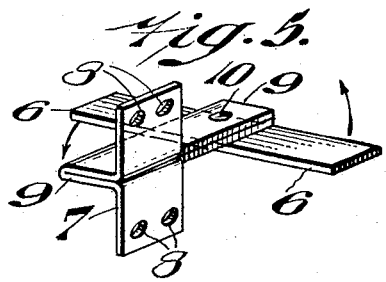
INVENTOR:
William Brownlow.
BY
ATTORNEYS.

Patented June 8, 1926.

1,588,163

UNITED STATES PATENT OFFICE.

WILLIAM BROWNLOW, OF LAWNDALE, PENNSYLVANIA.

ATTACHMENT FOR BRINE TANKS.

Application filed January 29, 1924. Serial No. 689,239.

This invention, generally stated, relates to brine tanks and has more especial relation to devices for maintaining freezing cans in proper position within such tanks.

The leading object of the present invention may be said to reside in the providing of a simple, efficient and comparatively inexpensive attachment for a brine tank whereby a freezing can is prevented from tilting and otherwise moving about within a tank compartment. A further object resides in the provision of general details of construction and arrangement of parts for attaining the results sought by the leading object. Other and further objects not at this time more particularly pointed out will appear hereinafter.

The invention consists of the novel construction hereinafter described and finally claimed.

The nature, characteristic features and scope of the invention will be more fully understood from the following description taken in connection with the accompanying drawings forming part hereof, and in which:

Fig. 1, is a fragmentary view in plan of a brine tank provided with a plurality of attachments embodying features of the invention.

Fig. 2, is a view in section taken upon the line 2—2 of Fig. 1.

Fig. 3, is a fragmentary view in end elevation of the attachment shown at the right hand side of Fig. 2.

Fig. 4, is a similar view of a slightly modified form of attachment, and

Fig. 5, is a perspective view of the attachment shown in Figs. 1, 2, and 3.

For the purpose of illustrating my invention I have shown in the accompanying drawings two forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, the numeral 1 designates a tank for containing a brine solution. The tank 1 at its upper portion is subdivided into a plurality of compartments 2 by means of a grid-like frame 3. The freezing cans 4 in use are positioned in compartments 2, one can being arranged in each compartment, as clearly shown in Fig. 1. In order to maintain the freezing cans 4 in proper position with respect to the brine within the tank 1, use is made of the attachment of the invention a description of which will now be given. The depending walls of the grid-like frame 3 are each slotted as at 5 the slots passing entirely through the frame. The purpose of these slots is to permit of a pivotal button 6 to be swung to a position in parallelism with the wall 3 in which a slot is formed, or to be swung to a position at right angles to said wall. In the former position, freezing cans 4 may be readily introduced to or removed from compartments 2 and in the latter position of said buttons the freezing cans 4 are maintained in a relatively fixed position. In other words, the freezing cans are prevented from bobbing up and down and because the buttons 6 are arranged in staggered relation tilting of the cans is prevented. The buttons 6 may be pivoted in a number of ways and in Fig. 5 I have shown the preferred embodiment thereof. In said figure the numeral 7 designates a vertical plate provided with screw receiving openings 8. Extended from the central part of plate 7 and at right angles thereto is an elongated button support 9. In use the button support 9, which has pivoted thereto as at 10, the buttons 6 upon the underside thereof, is positioned within a slot 5 as clearly shown in Fig. 2 with the plate 8 paralleling a wall 3, which plate is secured to said wall by means of screws 11. In this position of parts the lower portion of plate 7 extends below slot 5 so as to act as a stop for button 6. This is very clearly shown in both Figs. 1 and 2. In other words, when the button is swung to a position cross-wise of a wall 3 the bottom of plate 7 serves to align button 6 at right angles with wall 3. With the buttons 6 arranged as shown in Fig. 1, that is in staggered relation, and swung to operative position a freezing can is not only maintained immersed in the brine but is prevented from tilting and swaying, which is important. It will be readily understood that by swinging the buttons 6 from the position shown in Fig. 1 to positions paralleling the support 9 to which they are attached the cans may be readily removed.

In Fig. 4, a button 12 is pivoted as at 13 within a slot 5 and directly to a wall 3 instead of to a support 9, as before described. In order to limit the movement of a button 12 a plate 14 is arranged vertically across a slot 5 and secured to a wall 3 by means of screws 15. This construction serves the same purpose as the attachment previously described.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:

1. As a new article of manufacture, a turn button comprising a plate adapted for vertical attachment, said plate having extended therefrom at right angles thereto an elongated horizontally arranged support, said support extending beyond said plate on one side thereof, and a thin, flat, horizontally arranged button pivoted to one side of the side extension of said support.

2. As a new article of manufacture, a turn button comprising a vertically disposed plate bent intermediate its ends to form a horizontally disposed support of double thickness extending beyond the edge of said plate and an elongated horizontally arranged plate forming a button pivotally connected to the one side of the extension of said support.

3. As a new article of manufacture, a turn button comprising a substantially T-shaped support, the longest or stem portion of which extends beyond the edge of said support on one side thereof and is arranged horizontally and a thin, flat plate forming a button pivoted to the side extension of the stem portion of said support and arranged for movement in a plane below said stem, either at right angles to or parallel therewith.

In testimony whereof, I have hereunto signed my name.

WILLIAM BROWNLOW.